Patented Nov. 17, 1942

2,302,332

UNITED STATES PATENT OFFICE 2,302,332

COATING PROCESS

Robert M. Leekley, Wilmington, Del., assignor to E. I. du Pont de Nemours & Company, Wilmington, Del., a corporation of Delaware No Drawing. Application April 9, 1940, Serial No. 328,765

11 Claims. (Cl. 117—16)

This invention relates to a new process for the application to objects of coatings comprising organic material, particularly coatings comprising synthetic linear polymers of those types which are capable of being formed into pliable fibers. More especially, this invention relates to a new process for the application to objects of coatings comprising members of that class of fiber-forming polymers which are known as synthetic linear super-polyamides and are described for example, in U. S. Patents 2,071,250, 2,071,253, 2,130,523 and 2,130,948.

Many methods are known for the application of organic coating compositions. They commonly are applied from solution by brushing, dipping, or spraying. Most synthetic linear polyamides are so insoluble, however, except in toxic, corrosive liquids such as phenol, cresol, and formic acid, that they cannot safely be applied from solution. Solvents such as furfuryl alcohol, benzyl alcohol, ethylene glycol and formamide dissolve the synthetic linear polyamides at high temperatures, but since the polymers are rapidly degraded by these liquids at the temperatures required to keep them in solution, these solvents cannot well be used for solution coating.

Aqueous dispersions of synthetic linear polyamides may be used to produce discontinuous coatings, but it is necessary to heat them to at least the melting point of the polymer in order to make them continuous. Since many surfaces are injured by the high temperatures required for fusion of such dispersion coatings, the aqueous dispersions are of limited use as coating compositions. Furthermore, the fact that many polyamides tend to be decomposed by oxygen when melted in the presence thereof, makes it usually necessary to exclude air during the fusion step.

There are some materials which are not injuriously affected by the high temperatures involved in applying to them coatings of molten synthetic linear polyamides, but even with such materials this method may be more or less unsuitable when especially thin coatings are desired, or when the articles to be coated are of irregular shape. Elaborate equipment is required, moreover, since air must be excluded from the molten polymer.

This invention has as an object, therefore, a method for the application of coatings of synthetic linear polyamides by a process which is free of most or all disadvantages such as those hereinabove pointed out.

This object may be accomplished in accordance with the invention by the application to an object of a dispersion of particles comprising fiber-forming synthetic linear polyamide in a liquid medium which is not a solvent for the polymer at room temperature, or for example, at 50° C., but which becomes a solvent for the polymer at a higher temperature, which nevertheless lies below the boiling point of the medium and below the melting point of the polyamide, and heating the coating so as to dissolve the said polyamide in the said medium with simultaneous evaporation of the latter and consequent deposition of a continuous film of the synthetic linear polymer on the object. Such a medium will be designated hereinafter as a latent solvent for the said polyamide.

The dispersion may be applied to the article to be coated by any of the suitable known methods, as, for example, by brushing, spraying, dipping, or through the use of a leveling knife. The nature of the article to be coated determines the most suitable method of application. The article being coated is next heated to such a temperature that the polymer dissolves in the dispersion medium with simultaneous evaporation of the medium so that a solvent cast film is obtained. Degradation of the synthetic linear polyamide thus may be avoided by allowing it to remain in solution for only a very short time, and since the polymer is not attacked by oxidation under these conditions at the temperatures employed, due possibly to the blanketing effect of the solvent, the exclusion of air is rendered unnecessary. It is important, of course, that the heating step take place before the coating becomes dry, since sufficient liquid should be present to dissolve the finely divided synthetic linear polyamide particles at the elevated temperature, and to permit flow to a uniformity of thickness upon the surface of the article. In some cases very rapid heating consequently is required, since slow heating might cause the liquid to evaporate completely before the temperature necessary for solution was reached.

The methods of heating which sometimes are used include baking in an oven, pressing with a hot iron or in a hot press, heating by contact with molten metal, for example, Woods metal, and heating with infra-red radiation. The particular method used is determined by consideration of such factors as the composition used for coating the shape of the article, and the nature of the substratum.

This method of coating is distinctly different from coating with aqueous dispersions of synthetic linear polyamides. When an aqueous dispersion is applied and then heated, the water evaporates without dissolving the polymer, and leaves a discontinuous coating of finely divided particles of the synthetic linear polyamide. In order to produce a continuous film the coating then must be heated until the particles fuse together. In contrast, coatings applied according to this invention become continuous because the polymer dissolves in the liquid while the liquid is being evaporated. Since the hot solution of polymer formed during the heating process is relatively mobile, as already indicated, desirable flow of the polymer occurs and consequently thinner more uniform coatings can be obtained.

The toughness of the coating sometimes may be improved by cooling the article quickly as, for example, by immersion in cold water. In some cases, when the article being coated is sufficiently stable to heat, it is desirable to reheat the coated article to a temperature slightly above the melting point of the polymer, and then to quench the same quickly in cold water, since in this way it is possible in some cases to improve not only the toughness and the adherence of the coating, but also its uniformity. In this connection it may be observed that one of the most formidable difficulties encountered in the production of polyamide coatings by other methods is that of achieving uniformity, and that when the just described optional steps of melting and re-solidifying are practiced, the especially uniform quality of the ultimate coating, or the increased ease in producing the same, is attributable in part to the smoothness of the coat laid down initially, as a result of the aforesaid evaporation.

The dispersions may be prepared by the method described in application Serial No. 301,068, filed October 24, 1939. The choice of the most appropriate dispersion medium for each case depends upon the particular solubility behavior of the polymer, but for dispersions containing the more insoluble polyamides such as polyhexamethylene adipamide, suitable dispersion media are benzyl alcohol, furfuryl alcohol, ethylene glycol, di-(beta-hydroxyethyl) ether, and formamide. It often is desirable to dilute these dispersion media with other liquids having little or no solvent action. A mixture of water and ethylene glycol, for instance, is a useful dispersion medium, since the ethylene glycol remaining after the water volatilizes acts as a solvent at high temperature.

The following examples will illustrate the invention in greater detail.

*Example I*

Pieces of cold reduced black sheet iron of the type used in the manufacture of tinned plate are sprayed with a composition containing 20 parts of dispersed polyhexamethylene adipamide in 80 parts of furfuryl alcohol, and then lowered against the surface of a Wood's metal bath which has been heated at 200° C. After about 10 seconds, during which time the furfuryl alcohol almost completely volatilizes, the samples are removed and quenched in cold water. The coatings are smooth, uniform and continuous. Samples having coatings of 0.3–0.4 mil in thickness are suitable for stamping into can lids, with commercial can fabricating equipment. The coatings are not broken in this forming operation, and good adhesion is retained. If the coated metal is reheated above the melting point of the polymer (about 260° C.), however, and then quickly quenched in cold water, both the toughness and the adherence of the coat, as well as its uniformity, may be improved. The intrinsic viscosity of the coating, where intrinsic viscosity is defined as in U. S. Patent 2,130,948, is .74 as compared to .73 for the polymer used for preparing these dispersions, indicating that no decomposition has occurred.

*Example II*

A composition containing 30 parts of finely divided super-polyamide obtained by inter-polymerizing 34 parts of hexamethylene diammonium adipate with 66 parts of hexamethylene diammonium sebacate, 18 parts of amylbenzenesulfonamide, and 2 parts of ultramarine blue pigment dispersed in 70 parts of furfuryl alcohol is used for coating 1.32–53″ sateen. The coating composition is applied in thin coats with a leveling knife. After each coat the sample is heated by infra-red radiation until the particles dissolve in the furfuryl alcohol. The furfuryl alcohol is simultaneously evaporated with the formation of a glossy continuous coating of plasticized polyamide. The finished article obtained by applying 20 coats in this manner has an excellent, smooth, hard, glossy finish which is improved still further by press polishing at 4000 pounds pressure and 65° C. for five minutes.

*Example III*

A dispersion containing 3% polyhexamethylene adipamide, 43% di (beta-hydroxyethyl) ether, and 54% water is prepared by addition of di (beta-hydroxyethyl) ether to an appropriate aqueous dispersion. Prelaundered cotton broadcloth is impregnated with this composition, partially dried, and pressed at 170–200° C. between metal surfaces which have been lubricated with stearic acid. A pronounced stiffening effect is observed. The treated cloth absorbs "Pontacyl" fast blue from a 0.1% solution more rapidly than the untreated control. It is still blue after seven launderings such as remove substantially all of the color from an untreated sample.

*Example IV*

A piece of 1.32–53″ sateen is coated with a dispersion containing 10 parts of the finely divided synthetic linear polyamide obtained by interpolymerizing 60 parts of hexamethylene diammonium adipate with 40 parts of epsiloncaprolactam, 9 parts of amylbenzenesulfonamide and 1 part of ultramarine blue pigment dispersed in a mixture of 43 parts of ethanol and 3 parts of water. The application of the coating composition is made with a leveling knife and is followed by baking in an oven at 146° C., for five minutes after each coat. Application of 26 coats in this manner produces an attractive leather-like sheeting which embosses readily and possesses excellent pliability. It withstands 3500 scrubs in the test described in Automotive Industries 49, 1262–1266 (December 20, 1932), as compared to 240 scrubs for nitrocellulose coated fabric of the same weight.

*Example V*

A sample of #27 copper wire is coated with a dispersion containing 7.5 parts of finely divided solid polyhexamethylene adipamide particles dispersed in 21.7 parts di (beta-hydroxyethyl) ether diluted with 70.8 parts of water. The wire is passed through a vessel containing the dispersion and then upward through a vertical oven four feet in length, which is heated to 350-365° C. The wire, traveling at the rate of 8 ft./min., picks up an even coating of the dispersion in the vessel, and then, as the wire passes into the oven, the water is evaporated. As it passes higher in the oven, the polymer dissolves in the di-(beta-hydroxyethyl) ether, and flows sufficiently upon the wire so that a continous film of superpolyamide is deposited upon evaporation of the liquid. A smooth continuous coating 0.1 mil per side is applied in each pass through the equipment. The coating is built up to the desired thickness by repetition of the cycle.

Example VI

Kid leather is given a smooth finish by coating it with the dispersion of Example II and then heating with infra-red radiation. This coating is scuff resistant and has a high gloss. The coated leather is somewhat more rigid than an untreated sample.

It is not intended that the invention should be limited to the examples cited. In general, the fiber-forming synthetic linear polyamides useful in the practice of the invention have recurring amide groups in their chains. Upon hydrolysis with mineral acids they produce the amide-forming reactants from which they are formed. For example, a synthetic linear polyamide prepared from a dibasic acid and a diamine yields upon hydrolysis with hydrochloric acid the dibasic acid and the diamine hydrochloride. Instead of the polyamides mentioned above, which are obtained from bifunctional polyamide-forming reactants as essentially sole reactants, I may use synthetic linear superpolymers prepared by including with the polyamide-forming reactants used to prepare the polyamide, other bifunctional reactants such as glycols and hydroxy acids. As examples of such modified polyamides may be mentioned those derived from diamines, dibasic acids, glycols, and those derived from amino acids and hydroxy acids. Although these products contain ester linkages, they still can be referred to as polyamides since they contain a plurality of amide linkages and retain many of the desirable properties of simple polyamides. Like the simple polyamides, these modified polymers do not exhibit fiber-forming properties until their hereinabove referred to intrinsic viscosity is at least 0.4.

The dispersions used in this coating process may be modified by the addition of other materials. The modifying agents may be blended with the polyamides, dispersed in a dispersion medium or dissolved in the dispersion medium. Modifying agents include dispersing agents, plasticizers, waxes, resins, pigments, antioxidants, metal deactivators and ultra-violet light opacifiers. Suitable dispersing agents include proteins such as casein and soya bean proteins, polyvinyl alcohol, partially hydrolyzed polyvinyl acetate, soap, sulfated alcohols, and products known to the trade as "Sapamine" and "Leukanol." Among the appropriate plasticizers are the sulfonamides, such as p-toluenesulfonamide, the N-alkyl toluenesulfonamides, amylbenzenesulfonamide, and the N-alkylbenzene-sulfonamides, phenols, such as resorcinol, tertiary butyl phenol, diamyl phenol, 4-hydroxy-diphenyl, 2 (bis-4-hydroxyphenyl) propane; ether esters, such as di (methoxyethyl) adipate, di (methoxyethoxyethyl) sebacate; esters, such as diethyl phthalate and dibutyl phthalate; and ethers, such as dimethoxytetraethylene glycol. The addition of a plasticizer usually lowers the viscosity of the solution and increases the tendency of the composition to flow when heated. Waxes, although not compatible with polyamides, are suitable for use as modifying agents. These include paraffin, carnauba, montan, beeswax, and hydrogenated castor oil. Such materials, when used in small amounts, exude on the surface of the coating and improve the resistance of the coated article toward moisture. Pigments suitable for incorporation in the polyamide dispersion include zinc oxide, carbon black, lakes on inorganic substrates, azo pigments, Prussian blue, chrome green, titanium oxide, iron oxide, Lithol red, lithopone, zinc sulfide, iron blue, and the phthalogyanines. Mixtures of these pigments also may be used. Resins suitable for use in the polyamide dispersions include methacrylates, such as methyl methacrylate and butyl methacrylate, phenolformaldehyde resins, urea-formaldehyde resins, polyether resins, polyvinyl alcohol, polyvinyl acetate, partially hydrolyzed polyvinyl acetate, styrene polymers and interpolymers, neoprene, rosin, glyptals, ethylene-sulfur dioxide resins, cellulose ethers and esters, and polymeric hydrocarbons such as rubber, gutta-percha, ethylene and butylene polymers.

Powdered metals such as bronze or aluminum powder also can be used to modify the coating compositions. The metal can be included in the particles of the synthetic linear polymer or can be independently dispersed in the dispersion medium. Such dispersions are useful for application as decorative coatings for articles of apparel, for example, shoes, belts, buckles, and the like or for decorative containers and the like where a coating containing a metal is desirable. Insulating coatings containing finely divided metals are also known to reduce the corona losses at high voltages.

Since the finely divided polyamides suitable for use in these coating compositions are, due particularly to their large surface area, suitable as adsorbent materials generally, various adsorptive processes may be invoked for applying to the polyamide particles adsorbed deposits of desired gases, liquids or solutes. For instance, such deposits conveniently may be produced by dissolving or suspending the desired material in the dispersion medium, so that when the dispersion is effected the adsorption of the said material, whether selectively or not, from, in, or along with the said medium, shall take place. Adsorption processes, likewise, taking advantage of the large total surface area of the polyamide particles, may be utilized for bringing about absorption of desired material by them, and such absorption may take place either exclusively of, or in conjunction with, the aforesaid adsorption processes.

The dispersion media used in each case will depend upon the solubility of the particular superpolymer used and upon the coating temperature permissible. For example, a number of liquids, such as the lower aliphatic alcohols, may be operable for the application of the superpolyamides obtained by interpolymerization of hexamethylene diammonium adipate with epsilon-aminocaproic acid, but nevertheless not be satisfactory for applying unmodified polyhexamethylene adipamide. A high boiling dispersion medium such as di(beta-hydroxyethyl) ether, usually is not desirable, if the maximum coating temperature is to be 100° C., since such a medium is but very slowly volatilized at this temperature. The liquids suitable for use with the least soluble class of superpolyamides include aliphatic hydroxylated compounds boiling above 50° C. which are liquid at room or ordinary temperatures, typified by high boiling alcohols and glycols, such as benzyl alcohol, furfuryl alcohol, tetrahydrofurfuryl alcohol, methyl phenyl carbinol, phenyl ethyl alcohol, formal glycerin, fenchyl alcohol, 2,3-butylene glycol, butoxyethoxyethanol, ethylene glycol, di(beta-hydroxyethyl) ether, di(beta-hydroxyethoxyethane), 1-3-butylene glycol, propylene glycol, 1-methoxy-2,3-dihydroxypropane; amino alcohols, such as monoethanolamine, diethanolamine, and triethanolamine; hydroxy nitriles, such as beta-hydroxypropionitrile; also amides, such as formamide, methyl formamide, dimethyl formamide, ethanol formamide, dimethyl methoxyacetamide, and cyclohexyl formamide; halohydrins, such as ethylene bromohydrin, glycerol dichlorohydrin, and trimethylene chlorohydrin; acid anhydrides, such as propionic anhydrides; dinitriles, such as adiponitrile; aromatic nitro compounds, such as nitrobenzene; and high boiling amines, such as aniline. Additional liquids suitable for use with more soluble polyamide interpolymers and with polyamide polyesters, include aliphatic alcohols, such as butyl alcohol and isobutanol; cyclic alcohols such as cyclohexanol; unsaturated alcohols, such as allyl alcohol, methallyl alcohol; and methyl ethynyl carbinol; alcohols containing other groups, such as methoxyethanol and diacetone alcohol; esters, such as amyl acetate, diethyl adipate, and dimethyl phthalate; and ethers, such as diozane and dimethoxyethane. Aromatic hydrocarbons, such as toluene, xylene and mesitylene, are operable for the more soluble superpolymers. Mixtures of these liquids can be used. Liquids which are not solvents nevertheless can be used in some cases, as diluents in the dispersion media. Water can be used as a diluent, or in some cases to increase the solvent power of other liquids. Liquids which are solvents for superpolyamides at room temperatures can be used in combination with nonsolvents. Such liquids include phenol, cresol, allyl phenol, crotyl phenol, and xylenol. Such solvent-nonsolvent combinations in some cases operate in the same manner as single-component dispersion media, but in other cases, where the nonsolvent selected is more volatile than the solvent, the composition of the dispersion medium changes during the heating process. Solution of the polymer in this case is due not only to the elevated temperature, but to the change in the composition of the liquid phase.

The coatings may be heated by any of the known methods involving convection, conduction, or radiation; for instance, by heating in an oven, heating with a stream of hot gas, heating by contact with a hot surface, or submerging in a hot inert liquid. The use of radiant energy also is advantageous in heating the coatings. Infrared radiation of approximately three microns in wave length is particularly useful since this is the wave length most completely absorbed by many of the superpolymers. The coatings also can be heated by use of a high frequency electric field. Other methods of heating likewise may be employed.

The temperature to which the coatings are heated may be varied from 65 to 370° C., but temperatures of 100 to 250° C. ordinarily are used. The temperature employed in each case will depend upon the superpolymer and the media used in the dispersions, and upon the stability of the substratum toward heat. In general, a temperature is used which will not injure the substratum during the time required. The temperature usually is regulated at such a level as to evaporate the dispersion medium rapidly without blistering the coating.

Although it is usually convenient to heat the coatings at atmospheric pressure, either higher or lower pressures sometimes are useful. Reduced pressure may be used to increase the rate of vaporization of high boiling dispersion media. Increased pressures are useful for increasing the boiling point of low boiling dispersion media to permit higher coating temperatures. Through the use of the higher temperatures obtainable at increased pressures the polymer may be dissolved more rapidly without blistering due to rapid evaporation of the liquid. No limits of pressure are known except those imposed by the strength of the equipment being used.

Since some superpolymers tend to crystallize if they are cooled slowly, it often is advantageous to cool the coatings rapidly, as by immersing the article immediately in a cold liquid such as water. Other methods of cooling, such as spraying with liquid, cooling with air, or cooling by contact with other cold materials, likewise may be used. If some crystallization occurs during the time required to remove the dispersion medium, the coating may be reheated to the melting point of the polymer and then rapidly cooled by any of the suitable known methods of cooling.

As materials which may be coated by this process may be mentioned metal, ceramic ware, glass, cloth, leather, paper, and wood. Articles composed of such materials can be coated after they have been fabricated, or at any state during their fabrication. The articles also may be constructed from materials which previously have been coated according to this invention.

Due to the lower temperatures involved, the invention facilitates the coating of cloth, leather, paper, and wood, which would be subject to injury from the high temperatures required for coating with molten superpolyamide. Coated fabrics are useful for upholstery and for the manufacture of articles such as shoes and gloves, which ordinarily are made from leather. Application of small amounts of the superpolyamide to fabrics increases their body and stiffness without altering their general appearance. The fastness of many dyes for these fabrics also is improved. Polyamide coated leather has a high gloss and is remarkably resistant to wear and scuffing. It is suitable for the manufacture of articles for which nitrocellulose coated leather ordinarily is employed. Coating of paper by the method of this invention increases its resistance to both oil and water, and makes it suitable for packaging liquid products such as oil, milk, and the like. Polyamide coatings provide an attractive, durable, easily cleaned coating for wooden articles.

The invention is useful for coating metal and metal articles with continuous adherent coatings of synthetic linear polymers. The method permits the application of very thin yet uniform coats, and is suitable for coating articles of irregular size and shape. In addition to being decorative, the coatings prevent atmospheric oxidation, and attack by corrosive chemicals. The coatings also are useful as electrical insulation for metal articles.

As many apparently widely different embodiments of this invention may be made without departing from the spirit and scope thereof, it is to be understood that I do not limit myself to the specific embodiments thereof except as defined in the appended claims.

I claim:

1. The process of applying a continuous coating of a fiber-forming synthetic linear polyamide to an object which comprises dispersing discrete particles of the polyamide in a liquid medium at room temperature, said liquid being a non-solvent for said polyamide at room temperatures but being a solvent for said polyamide at elevated temperatures below the melting point of said polyamide, applying to said object the liquid at room temperature containing the discrete particles of polyamide dispersed therein, heating in situ on the object said liquid containing the dispersed polyamide to such an elevated temperature below the melting point of said polyamide as to dissolve the polyamide in said liquid, evaporating said liquid and depositing from solution therein a continuous coating of the polyamide upon said object.

2. The process set forth in claim 1 wherein the continuous coating on said object is rapidly cooled after evaporation of said liquid.

3. The process set forth in claim 1 wherein said liquid containing the dispersed polyamide is rapidly heated with infra-red radiation in situ on the object to such an elevated temperature below the melting point of said polyamide as to dissolve the polyamide in said liquid and to evaporate said liquid, whereby a continuous coating of the polyamide is deposited from solution upon said object.

4. The process set forth in claim 1 wherein said liquid containing the dispersed polyamide is rapidly heated with a high frequency electric field in situ on the object to such an elevated temperature below the melting point of said polyamide as to dissolve the polyamide in said liquid and to evaporate said liquid, whereby a continuous coating of the polyamide is deposited from solution upon said object.

5. The process set forth in claim 1 wherein said liquid containing the dissolved polyamide is evaporated under reduced pressure, whereby a continuous coating of the polyamide is deposited from solution upon said object.

6. The process set forth in claim 1 wherein said liquid containing the dispersed polyamide is rapidly heated under superatmospheric pressure in situ on the object to such an elevated temperature below the melting point of said polyamide as to dissolve the polyamide in said liquid and said liquid is then evaporated, whereby a continuous coating of the polyamide is deposited from solution upon said object.

7. The process of applying a continuous coating of a fiber-forming synthetic linear polyamide to an object which comprises dispersing discrete particles of the polyamide in an aliphatic hydroxylated liquid medium at room temperature, said liquid being a non-solvent for said polyamide at room temperatures but being a solvent for said polyamide at elevated temperatures below the melting point of said polyamide, applying to said object the liquid at room temperature containing the discrete particles of polyamide dispersed therein, heating in situ on the object said liquid containing the dispersed polyamide to such an elevated temperature below the melting point of said polyamide as to dissolve the polyamide in said liquid, evaporating said liquid and depositing from solution therein a continuous coating of the polyamide upon said object.

8. The process of applying a continuous coating of a fiber-forming synthetic linear polyamide to an organic material which comprises dispersing discrete particles of the polyamide in a liquid medium at room temperature, said liquid being a non-solvent for said polyamide at room temperatures but being a solvent for said polyamide at elevated temperatures below the melting point of said polyamide, applying to said organic material the liquid at room temperature containing the discrete particles of polyamide dispersed therein, heating in situ on the organic material said liquid containing the dispersed polyamide to such an elevated temperature below the melting point of said polyamide as to dissolve the polyamide in said liquid, evaporating said liquid and depositing from solution therein a continuous coating of the polyamide upon said organic material.

9. The process of applying a continuous coating of a fiber-forming synthetic linear polyamide to an object which comprises dispersing discrete particles of the polyamide in a liquid mixture at room temperature, said liquid mixture containing at least two components and being a non-solvent for said polyamide at room temperature but on partial evaporation of one of said components being a solvent for said polyamide at elevated temperatures below the melting point of said polyamide, applying to said object the liquid mixture at room temperature containing the discrete particles of polyamide dispersed therein, heating in situ on the object said liquid mixture containing the dispersed polyamide to such an elevated temperature below the melting point of said polyamide as to partially evaporate one of said components and to dissolve the polyamide in said liquid mixture, evaporating said liquid mixture and depositing from solution therein a continuous coating of the polyamide upon said object.

10. The process set forth in claim 7 in which the polyamide is polyhexamethylene adipamide and the aliphatic hydroxylated liquid medium is furfuryl alcohol.

11. The process set forth in claim 7 in which the polyamide is polyhexamethylene adipamide and the aliphatic hydroxylated liquid medium is di(beta-hydroxy-ethyl) ether.

ROBERT M. LEEKLEY.